United States Patent [19]
Gorsica, Jr.

[11] 3,988,602
[45] Oct. 26, 1976

[54] METHOD AND APPARATUS FOR ENHANCING DATA

[75] Inventor: Thadeus E. Gorsica, Jr., Uniontown, Ohio

[73] Assignee: Goodyear Aerospace Corporation, Akron, Ohio

[22] Filed: Feb. 3, 1975

[21] Appl. No.: 546,862

[52] U.S. Cl. .................. 235/150.1; 178/DIG. 5; 178/DIG. 28; 235/151.3
[51] Int. Cl.² .................. G06F 7/38; H04N 7/02
[58] Field of Search ........... 235/150.1, 151.3, 181, 235/168; 250/475; 178/DIG. 34, DIG. 5, DIG. 16, DIG. 28, 6.8, 7.8; 356/203, 202

[56] References Cited
UNITED STATES PATENTS

| | | | |
|---|---|---|---|
| 3,503,689 | 3/1970 | Miller et al. | 356/203 |
| 3,535,443 | 10/1970 | Rieke | 178/6.8 |
| 3,582,651 | 6/1971 | Siedband | 250/93 |
| 3,614,311 | 10/1971 | Fujiyasu et al. | 178/6.8 |
| 3,813,545 | 5/1974 | Barnhart et al. | 250/306 |
| 3,869,602 | 3/1975 | Sezaki et al. | 178/DIG. 5 X |

*Primary Examiner*—Edward J. Wise
*Attorney, Agent, or Firm*—J. G. Pere

[57] ABSTRACT

A technique and apparatus for enhancing the data upon a film transparency is presented. The density characteristics of the object film are digitized and shifted to exponentially increase the magnitude and significance of the digitized data. This amplified data is then utilized for producing a second film transparency having increased contrast in accordance with the amplification of the original data. There is also provided means for offsetting the digitized data with respect to a fixed reference such that features of interest may be separated from their background before the final recording of the enhanced film.

10 Claims, 7 Drawing Figures

INPUT-16x ENHANCEMENT

INPUT-16x ENHANCEMENT (25% OFFSET)

METHOD AND APPARATUS FOR ENHANCING DATA

BACKGROUND OF THE INVENTION

The utilization of x-rays and other photographic medium for obtaining data relative to the structural characteristics of an object has been known for many years. Images are often encountered wherein the features of interest may be separated from their surroundings by only a small difference in brightness, thus making the examination or even the detection of these features a difficult proposition for a human inspecting the same. The images of interest may be in an electronic form such as the video information being fed to a closed circuit television monitor, or in photographic form such as in x-ray or nuclear radiograph of a part being inspected for cracks and other flaws. Of course, medical radiographs and the interpretation thereof are also subject to such problems. An additional difficulty in the case of radiographs stems from the somewhat limited ability of the human eye to observe minute density differences in those portions of the photographic transparencies with near zero density (almost transparent) and in portions with high density (almost no light transmittance).

In order to make maximum use of the photographic images discussed hereinabove, a device and technique must be implemented for enhancing the contrast of an image at all levels of density (or brightness) without exceeding the dynamic range of the display medium (cathode ray tube monitor, or film) and without exceeding the dynamic range of the human utilizing the same.

Consequently, it is an object of the instant invention to present a method and apparatus for enhancing data whereby data recorded on a first media in accordance with a first transfer function may again be recorded on a second medium in accordance with a second transfer function, the second transfer function being an enhancement of the first.

Yet another object of the invention is to present a method and apparatus for enhancing data whereby imaged data may be digitized, the digitized values shifted, and re-imaged so as to present an enhanced image structure.

Still another object of the invention is to present a method and apparatus for enhancing data whereby image data may be digitized, and the digitized data be shifted and offset an incremental amount so as to provide for maximum enhancement between background structure and subtle features.

Still another object of the invention is to present a method and apparatus for enhancing data whereby the positioning and size of a flaw within an object may be determined.

Still a further object of the invention is to present a method and apparatus for enhancing data which is inexpensive, reliable, and easily developed from the state of the art.

These objects and other objects which will become apparent as the detailed description proceeds are achieved by a technique and apparatus for initially digitizing the density-related signal achieved from scanning an object film, offsetting that digitized value, shifting the values towards the most significant bit to achieve the desired enhancement, and reconverting the signals to an analog signal, if need be, for reproduction in a common film recorder of an enhanced film.

For a complete understanding of the structure and techniques of the invention reference should be had to the following detailed description and accompanying drawings wherein.

A normal photo transparency, such as a radiograph or x-ray, contains upon a two dimensional reference, a plurality of areas of varying light transmittance characteristics. These variations are indicative of the particular characteristics of the imaged object but often times the most important data acquired by means of the x-ray or radiograph is hidden or undiscernable within the background of the structure of the object. However, the information or critical data is indeed present on the image-bearing transparency but is only unintelligible in that state. Consequently, it becomes necessary to reproduce the image of the transparency in a unique and unusual way in order to enhance those areas which bear the critical data.

Figure 1:
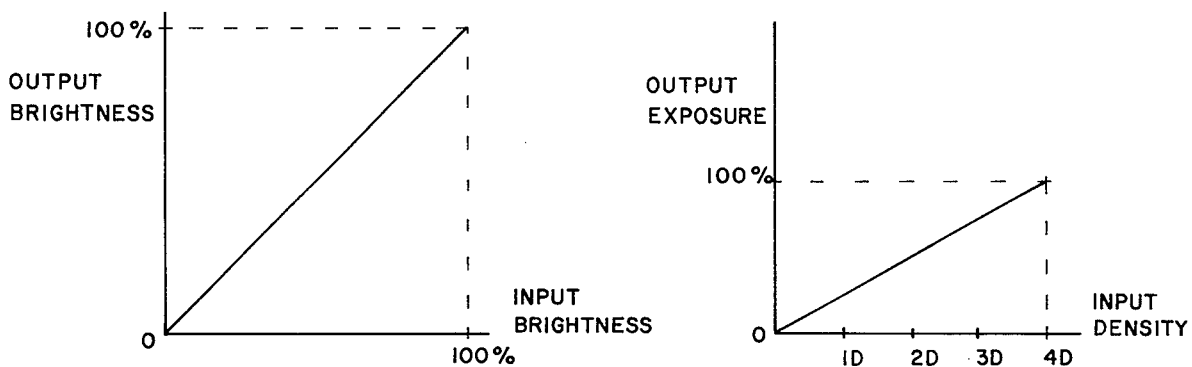
FIG. 1 is a graphical illustration of the standard transfer function associated with image production.

If the original image were to be reproduced with no enhancement whatsoever, the transfer function (brightness out vs. brightness in, or density out vs. density in) would be a straight line function as shown in FIG. 1. The reproduced image would be an exact replica of the original image due to the straight line transfer function.

Figure 2:
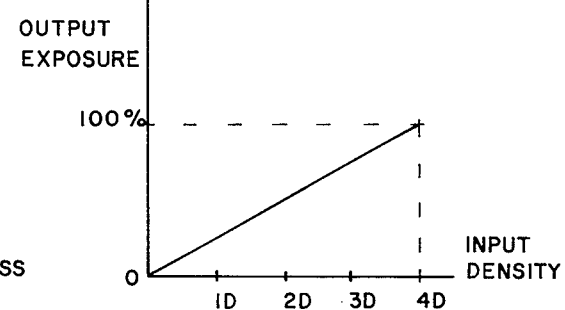
FIG. 2 is a graphical illustration of a logarithmic transfer function, providing a first step of enhancement.

The first step in enhancing the original image in the reproduction process is to use a logarithmic transfer function as shown in FIG. 2 where the input is in terms of density of the original image and the output is in terms of exposure on film stock to generate a new transparency. As is well known in the art, density is a log function of transmission and thus, even though FIG. 2 plots as a straight line, the same is a logarithmic function since density is a logarithmic function of the transmittance or brightness of the original image. While the graph of FIG. 2 would indicate that a reversal would be present when developing the reproduction, with original blacks coming out white and vice versa, this is of no consequence since the output media may contain yet another reversal if necessary by, for example, making the final exposure on normal film stock.

As is well known in the art, the process of exposing an original radiograph inherently contains an exponential transfer function. Consequently, by using the logarithmic function of FIG. 2 in the enhancement process, the transmittance of the enhanced image becomes linearly related to the thickness of the original part and leads to the conclusion that the enhanced image may be calibrated to determine the actual thickness at any point on the original part.

Figure 3:
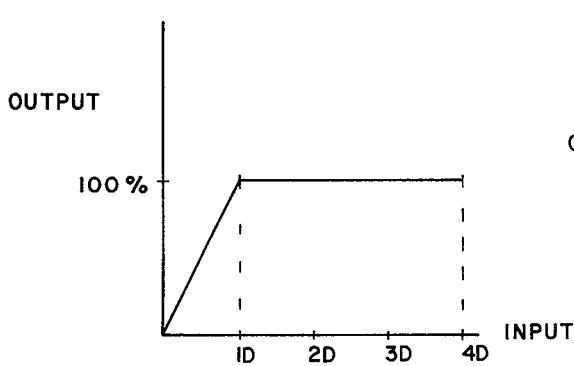
FIG. 3 is a graphical illustration of the transfer function obtained with a large gain in the system.

By using the transfer function as related in FIG. 2, no vast improvement or increase in contrast is achieved. FIG. 3 presents the transfer function obtained if a large gain is placed in the reproduction system. The contrast here is greatly enhanced but only over a small range of the input density and the output media quickly saturates. In other words, those areas of the original image of densities of 0 - 1D are greatly enhanced in the reproduction but those areas of density greater than 1D become unintelligible in the reproduction.

Figure 4:
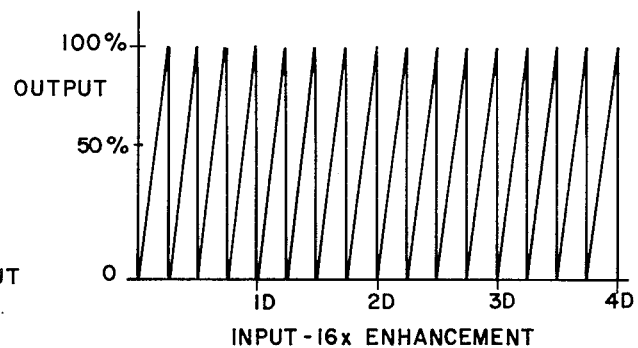
FIG. 4 is a graphical illustration of a transfer function resulting in an image enhancement of 16×.

In FIG. 4 there is presented an enhancement transfer function which presents a great increase in contrast over the full input dynamic range. The enhancement utilizing this density transfer function is 16 times that of the original image enhancement. This transfer function appears as an idealized saw-tooth wave having a positive slope variable in dependence upon the number of "teeth" selected to cover the full input density range. The return or negative slope of the transfer function is always minus infinity. By utilizing the transfer function of FIG. 4, contrast may be greatly enhanced while all geographic areas of the original image will appear with enhanced contrast on the output image since any input density value has a valid output value. This is true even if the original image had an extremely large dynamic range.

Figure 5:
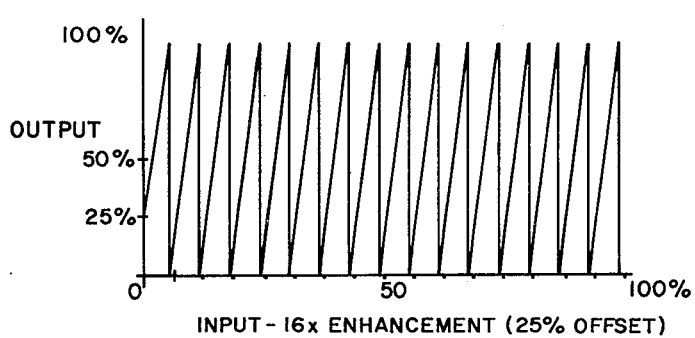
FIG. 5 is a graphical illustration of the enhanced transfer function of FIG. 4 having a 25% offset.

A further improvement may be made upon the transfer function related in FIG. 4 by shifting the 0 point of the saw-teeth laterally along the input density range allowing the discontinuities of the saw-teeth to be positioned at any selected input density as shown in FIG. 5. It should be readily apparent to those skilled in the art that the greatest feature enhancement is then found when the density of the feature being sought and the density of the surrounding area are split by one of the saw-teeth vertical discontinuities. In other words, at almost adjacent points along the input range, an almost total separation on the output range will be experienced. This gives a near infinite gamma or contrast and the output image then shows the feature as white on a black background or vice versa. Of course, the lateral shifting of the transfer function is only an increment of the saw-tooth period since greater shifts would be redundant.

It should be readily apparent then that by utilizing an original x-ray, radiograph, or other transparency as an input image, a greatly enhanced output image may be achieved by means of the utilization of the transfer function of FIGS. 4 and 5.

Figure 6:
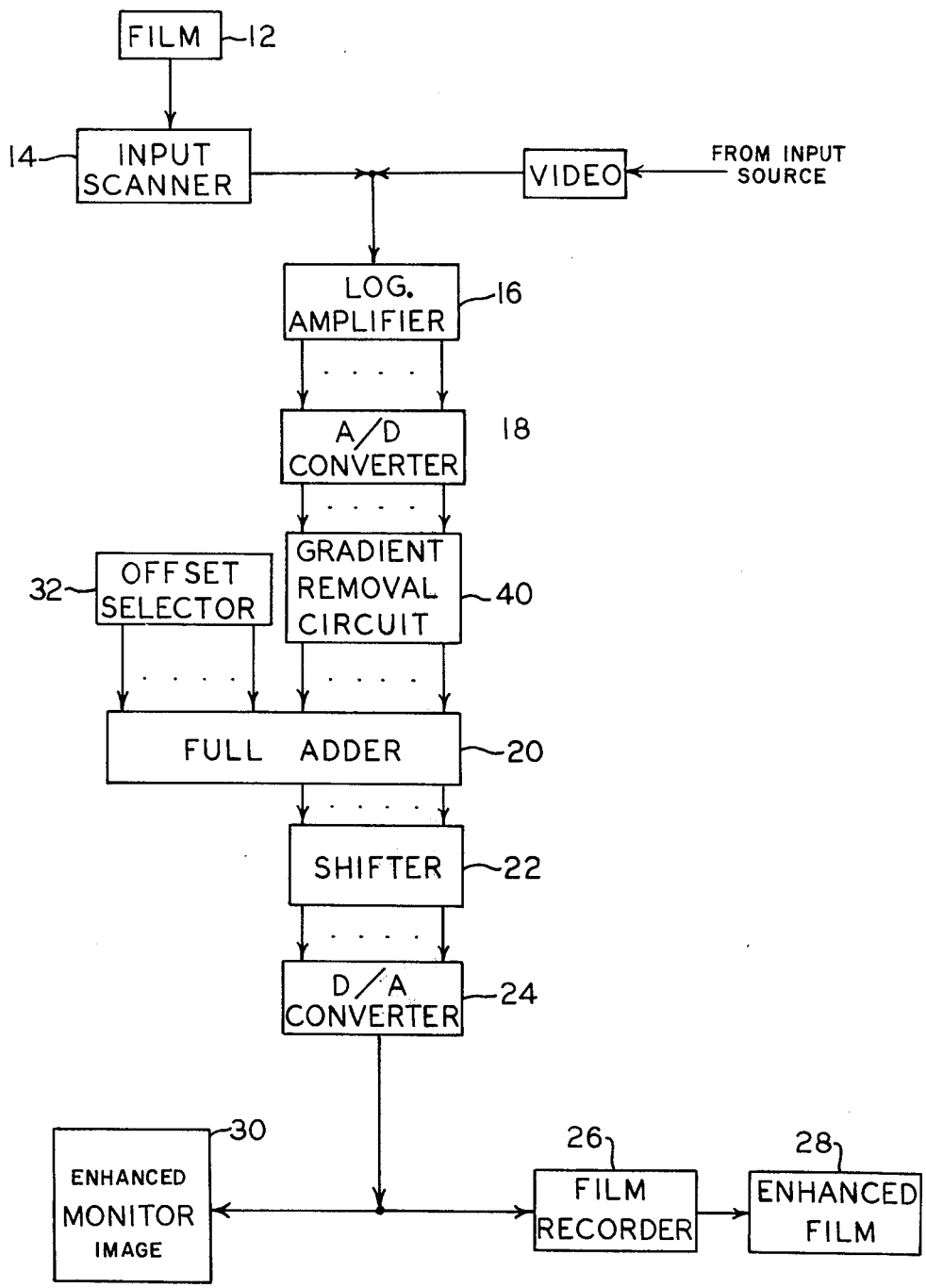
FIG. 6 is a block diagram schematic of the apparatus of the invention.

Referring now to FIG. 6, the structures necessary for generating and implementing the transfer functions discussed hereinabove can be seen. The original image is contained upon the film 12 which may comprise an x-ray, radiograph, or other suitable transparency. The film 12 is appropriately scanned by means of the input scanner 14 which may comprise a drum scanner, microdensitometer, vidicon tube, image dissector tube, or the like. Suitable devices which have been utilized include the Model 57 image digitizer by Dicomed Inc. and the scanning microdensitometer, Model 650, by Technical Operations, Incorporated of Burlington, Mass. In either case, these devices are well known and understood by those skilled in the art and are used for purposes of sequentially scanning the input image on an element by element basis. These picture elements, commonly called pixels, are each individually and sequentially scanned by scanner 14. The size of the pixels and the spacings thereof are of course programmable and, indeed, the pixels may be spaced apart or may overlap in accordance with the dictates of the operator. If the input scanner 14 is operative for producing an output corresponding to light transmission intensity through the film 12, then it is necessary to pass the output thereof through the logarithmic amplifier 16 such that the output of the amplifier 16 is indicative of the density of the various film pixels. As mentioned hereinabove, and as is well known to those skilled in the art, density is a logarithmic function of intensity and hence the log amplifier 16 provides an important function for those devices producing outputs related to intensity. It should of course be understood that many devices present outputs corresponding to density and hence the log amplifier 16 would not be required. In any event, there is applied to an analog to digital converter 18 analog signals indicative of the density of the related pixels being scanned.

There is presented at the output of the analog to digital converter 18 digital signals relating the density of the associated pixels; thus, the data on the film 12 is digitized. The output of the converter 18 is passed to a full adder 20 which also receives an input from the offset selector 32. For purposes of the present discussion, it will be assumed that there is no input supplied by the offset selector 32 and hence the output of the full adder 20 is the same as the digitized input thereto received from the converter 18.

The shifter 22 functions to achieve the generation of the saw-tooth portion of the transfer function discussed hereinabove. This element shifts the outputs of the full adder 22 toward the most significant bit before applying them to the input of the digital to analog converter 24. In other words, the shifter 22 is operative to delete a number of the most significant bits received from the full adder 20 and shift all of the remaining bits the number of positions deleted thus amplifying the significance of the remaining bits. Of course, the shifter 22 could comprise nothing more than a switch operative for selectively connecting the outputs of the full adder 20 to the inputs of the converter 24. It should be readily appreciated that a shift of 1 bit results in a doubling of the significance of the remaining bits while a shift of two bits guadruples the significance of the remaining bits and so on. In other words, if the shifter 22 shifts the data $n$ bits then the significance of the remaining bits is increased by $2^n$. It is important to note that the shift from the outputs of the full adder 20 to the inputs of the digital to analog converter 24 is toward the most significant bit.

There is thus presented at the output of the converter 24 an amplified analog signal enhanced by means of the shifter 22 and bearing the data present on the film 12. This analog signal is then passed to a standard film recorder 26 whereby the development of an enhanced film 28 may be achieved by the normal process. Of course, the signal could be passed to an appropriate monitor or CRT 30 in a normal fashion.

As discussed hereinabove with respect to FIG. 5, the saw-tooth transfer function may be laterally offset with respect to the input data values presented to the shifter 22 by means of the addition of an offset increment. By adding a fixed value selected by means of the offset selector 32 to the output of the analog to digital converter 18 within the full adder 20, this offset may be achieved. The purpose of this offset again is to force the features being sought to fall on nearly adjacent opposite sides of the negative going slope of the sawtooth curve such that the contrast between the feature and the background will be optimized. Various increments of offset may be selected and various passes made on each of the image films 12 to swing through the full range covered by a period of the transfer function to guarantee that optimum contrast has been achieved for each object film or each geographical area of a given object film.

In general then it can be seen that the technique and apparatus of the invention is operative for initially digitizing the density-related signal achieved from scanning an object film, offsetting that digitized value, shifting the values towards the most significant bit to achieve the desired enhancement, and reconverting the signals to an analog signal, if need be, for reproduction in a common film recorder of an enhanced film.

A further attribute of the technique and utilization of the structure of the instant invention as described above resides in the ability to produce a quasi-three dimensional view of an object from a two dimensional transparency of that object. By referring to the transfer function of FIG. 4, it can be appreciated that the sawtooth transfer function shown therein actually comprises 16 individual ramp transfer functions separated by discontinuities. In other words, each period of the transfer function could be treated as a separate and distinct transfer function and allowed to enhance an object film in accordance therewith. If each such period of the transfer function of FIG. 4 were so treated, an enhancement of an object film could be achieved on a composite of sixteen enhanced output media. Each of the output media operates on a different range of input densities enhancing the same to the output densities correlating to the function of FIG. 4. As stated hereinbefore, the transmittance of the enhanced image is linearly related to the thickness of the original part and hence, by stacking the plurality of output media on top of each other in order of the period of the transfer function which they represent, a quasi three dimensional view of the object film may be achieved.

Even utilizing the techniques and structure of the invention presented hereinabove, the distinguishing of flaws, cracks or the like within the structural background of a work piece may often times be a difficult proposition. It has been found that the contours of most flaws, and particularly cracks, change more rapidly than do the natural contours of a work piece. Consequently, by normalizing the transparency and each pixel thereof with respect to the average of all neighboring pixels it has been found that flaws may be readily discernable. A circuit for achieving such averaging or normalization is shown in FIG. 6 as the element 40 which may be interconnected between the A/D converter 18 and full adder 20. A block diagram of the structure of this element 40 is shown in FIG. 7.

Figure 7:
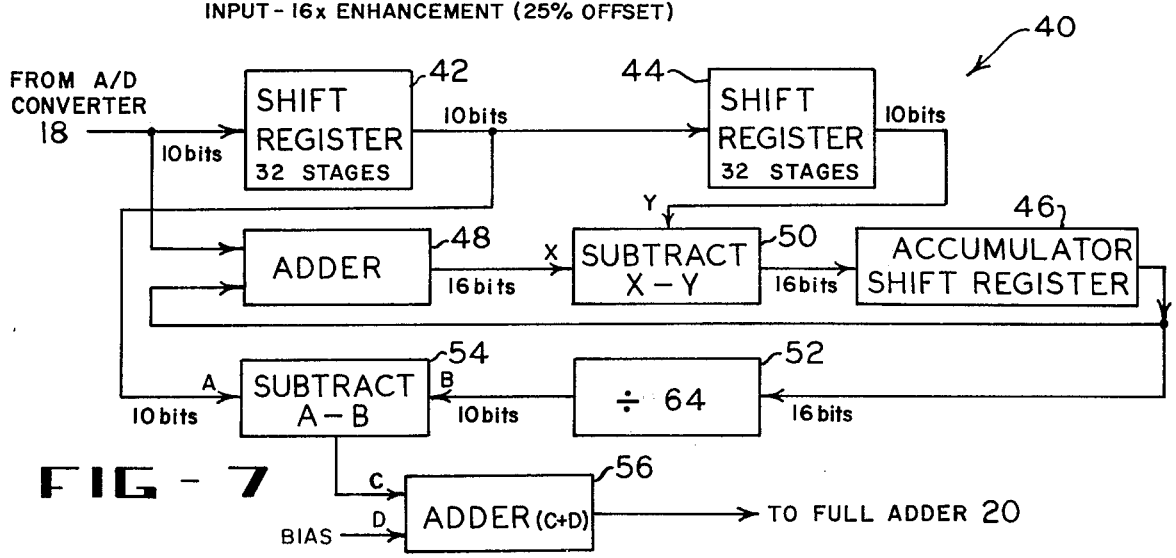
FIG. 7 is a block diagram schematic of the gradient removal circuitry of the invention as the same is incorporated in the structure of FIG. 6.

Referring now to FIG. 7, it can be seen that the digitized pixel information from the A/D converter 18 is supplied to a shift register 42; such shift register being capable of containing information relative to 32 such pixels. Connected to and receiving the output of the shift register 42 is a similar shift register 44, again being a 32 stage register. An accumulator 46 is provided to receive and maintain an updated aggregate of the digitized pixel densities as the same are received from the A/D converter 18. As the microdensitometer is utilized in analyzing the image, it is processed on a pixel by pixel basis, such that the value within the accumulator 46 is updated by adding to the present value thereof the value of the new pixel within the adder 48. This updated value is then reduced by the value of the pixel 64 pixels away within the subtract circuit 50. This value is then stored in the accumulator 46. Basically, the accumulator 46 contains an aggregate of the digitized values of 64 pixels, the value being updated by replacing the value of the pixel being scanned at any particular time for the value of the pixel scanned 64 pixels earlier.

The output of the accumulator 46 is passed to the divider 52 to give an average of the density of the 64 pixels stored therein. The divider 52 may, of course, be of any suitable nature as is well understood by those skilled in the art. The pixel average output of the divider 52 is passed to the subtract circuit 54 which also receives the output of the shift register 42. It should be readily apparent that this output is the digitized value of the center pixel of that group of pixels represented by the value stored within the accumulator 46. The output of the subtract circuit 54 is thus the deviation of the density of a pixel from the value of surrounding pixels on either side thereof. To a degree, the output of the element 54 is thus a normalized density output. This output may be applied directly to the input of the full adder 20 as shown in FIG. 7. However, it is often times undesirable to have a negative input to the adder 20 and hence the output of subtract circuit 54 is applied to an adder 56 wherein the same is altered by a bias level. The bias applied to the adder 56 is most generally selected as the center of the operating range of pixel deviation such that positive and negative excursions about the bias level will be substantially equal. The bias level virtually guarantees that the output of the adder 56 will cause all inputs to the adder 20 to be positive.

It should be readily apparent from an understanding of the function of the circuitry of FIG. 7, that the high frequency changes of density associated with flaws, cracks and the like will result in highly distinguishable deviations above the average value of neighboring pixels as the same are contained in the accumulator 46. Thus, the normalized output resulting from the structure of FIG. 7 and combined with the offset technique as shown in FIG. 5 will readily distinguish sharply varying density deviations above the background density.

Thus it can be seen that the objects of the invention have been satisfied by the techniques and structure presented hereinabove. While in accordance with the patent statutes only the best mode and preferred embodiment of the invention has been presented and described in detail, it is to be understood that the invention is not limited thereto or thereby. Consequently, for an appreciation of the scope and breadth of the invention reference should be had to the following claims.

I claim:
1. Apparatus for enhancing the data contained on a film transparency, comprising:
   first means for scanning said film transparency in discrete elements and digitizing the data of each of said elements;
   a shifting circuit connected to said first means for shifting the digitized data of each and every element a predetermined number of positions toward the most significant bit of said data;
   second means connected to said shifting circuit for converting said amplified digital data into analog signals; and third means connected to said second means for receiving said analog signals and recording the same on an output medium.

2. The apparatus for enhancing data as recited in claim 1 which further includes an adder interconnected between the first means and said shifting circuit, said adder adding a fixed value to the digital value of each and every element.

3. The apparatus for enhancing data as recited in claim 1 which further includes a gradient removal circuit interconnected between said first means and said shifting circuit; the gradient removal circuit normalizing the digital value of the data of each of said elements with respect to certain surrounding elements.

4. The apparatus for enhancing data as recited in claim 1 wherein said first means comprises a microdensitometer.

5. The apparatus as recited in claim 1 wherein said second means comprises a digital to analog converter and wherein said third means comprises a film recorder.

6. The method for enhancing the data contained on a film transparency, comprising the steps of:
  a. sectioning said transparency into specific discrete elements;
  b. digitizing the data contained in each of said elements, said data being a function of the density of the elements;
  c. amplifying the digitized data of each and every element by the same order of magnitude by shifting the digitized data a specific number of positions toward the most significant bit thereof;
  d. converting the amplified digitized data of each of said elements to an analog data form; and
  e. recording the analog data on an output medium.

7. The method for enhancing data as recited in claim 6, which further includes the step of adding a preselected fixed value to the digitized value of the data of each and every element.

8. The method for enhancing data as recited in claim 7 which further includes the step of normalizing the value of the digitized data of each and every element with respect to the value of the digitized data of certain neighboring elements of each of said elements.

9. The method for enhancing data as recited in claim 6 which further includes the step of normalizing the value of digitized data of each and every element with respect to the digitized data of certain neighboring elements of each of said elements.

10. The method for enhancing data as recited in claim 6 which further includes the step of adding a preselected fixed value to the digitized value of the data of each and every element.

* * * * *